United States Patent
Gray et al.

(10) Patent No.: US 8,381,827 B2
(45) Date of Patent: Feb. 26, 2013

(54) SPRING MOUNTED BLADE ASSEMBLY AND TILLAGE IMPLEMENT THEREWITH

(75) Inventors: Geof J. Gray, Burford (CA); John Mark Averink, Norwich (CA)

(73) Assignee: Salford Farm Machinery Ltd. (CA)

( * ) Notice: Subject to any disclaimer, the term of this patent is extended or adjusted under 35 U.S.C. 154(b) by 75 days.

(21) Appl. No.: 12/964,261

(22) Filed: Dec. 9, 2010

(65) Prior Publication Data

US 2011/0132628 A1   Jun. 9, 2011

Related U.S. Application Data

(60) Provisional application No. 61/285,176, filed on Dec. 9, 2009.

(51) Int. Cl.
| | |
|---|---|
| A01B 5/00 | (2006.01) |
| A01B 7/00 | (2006.01) |
| A01B 21/00 | (2006.01) |
| A01B 35/16 | (2006.01) |
| A01B 35/28 | (2006.01) |
| A01B 39/08 | (2006.01) |

(52) U.S. Cl. ..................................................... 172/573
(58) Field of Classification Search ................ 172/573, 172/572, 570, 574, 142, 193
See application file for complete search history.

(56) References Cited

U.S. PATENT DOCUMENTS

| | | | |
|---|---|---|---|
| 1,817,851 A | 8/1931 | Shelton | |
| 2,211,675 A | 9/1939 | Rushbrook | |
| 2,320,742 A | 6/1943 | Newkirk | |
| 2,352,963 A * | 7/1944 | McMahon | 172/451 |
| 2,664,040 A | 12/1953 | Beard | |
| 2,952,324 A | 9/1960 | Shumaker et al. | |
| 2,998,083 A | 8/1961 | Van Der Lely et al. | |
| 3,061,018 A | 10/1962 | Olson | |
| 3,150,722 A * | 9/1964 | Tromm | 172/707 |
| 3,171,243 A | 3/1965 | Johnston | |
| 3,296,985 A | 1/1967 | Shelton | |
| 3,640,348 A | 2/1972 | Womble | |
| 3,650,334 A | 3/1972 | Hagenstad | |
| 4,094,363 A | 6/1978 | McCoomb | |
| 4,412,588 A | 11/1983 | van der Lely et al. | |
| 4,452,319 A * | 6/1984 | Miguet et al. | 172/573 |
| 4,520,875 A | 6/1985 | Deckler | |
| 4,589,497 A | 5/1986 | Kovar | |
| 4,745,978 A | 5/1988 | Williamson | |

(Continued)

FOREIGN PATENT DOCUMENTS

| | | |
|---|---|---|
| DE | 2903620 A1 | 8/1980 |
| DE | 9102567 U1 | 5/1991 |

(Continued)

*Primary Examiner* — Arpad Fabian-Kovacs
(74) *Attorney, Agent, or Firm* — Katten Muchin Rosenman LLP

(57) ABSTRACT

Tillage blade assemblies comprising a coil spring with a horizontal spring axis to permit upward deflection of a concave tillage blade in response to impact with obstacles with a mounting assembly that provides for mounting the tillage blades in a particular orientation relative to the ground and the direction of travel of the implement. Forces acting on the tillage assembly due to movement of the blade through the soil are balanced such that there is little or no distortion of the coil spring relative to its spring axis. This prevents an off-axis load from acting on the spring when the assembly is in use and allows the blade to track through the soil at a desired angle. Impact with obstacles, such as rocks, is absorbed by deflection of the coil spring, thereby mitigating damage to the assembly. Tillage implements comprising the blade assemblies are able to operate at higher speeds than can usually be obtained for tillage implements, due to the absorption of impact energy by the spring.

20 Claims, 5 Drawing Sheets

U.S. PATENT DOCUMENTS

| | | | |
|---|---|---|---|
| 4,759,411 A * | 7/1988 | Williamson | 172/572 |
| 4,781,129 A * | 11/1988 | Swanson et al. | 111/167 |
| 4,796,550 A * | 1/1989 | Van Natta et al. | 111/135 |
| 5,042,590 A | 8/1991 | Bierl et al. | |
| 5,267,619 A | 12/1993 | Eversole | |
| 5,678,930 A * | 10/1997 | Kreftmeyer et al. | 384/157 |
| 6,138,771 A * | 10/2000 | Skjaeveland | 172/708 |
| 6,158,523 A | 12/2000 | Gengler et al. | |
| 6,412,571 B1 | 7/2002 | McIlhargey | |
| 6,913,085 B2 * | 7/2005 | Ruckle | 172/574 |
| 7,520,338 B2 | 4/2009 | Stokes | |
| 7,762,345 B2 | 7/2010 | Rozendaal et al. | |
| 8,113,295 B2 * | 2/2012 | Rozendaal et al. | 172/573 |
| 2004/0245004 A1 * | 12/2004 | Ruckle | 172/394 |
| 2006/0048953 A1 * | 3/2006 | Rozendaal et al. | 172/35 |
| 2007/0261865 A1 | 11/2007 | Taege et al. | |
| 2011/0056712 A1 * | 3/2011 | Rozendaal et al. | 172/1 |
| 2011/0073333 A1 * | 3/2011 | Rozendaal et al. | 172/573 |

FOREIGN PATENT DOCUMENTS

| | | |
|---|---|---|
| DE | 10137624 B4 | 4/2006 |
| FR | 2882216 A1 | 8/2006 |

\* cited by examiner

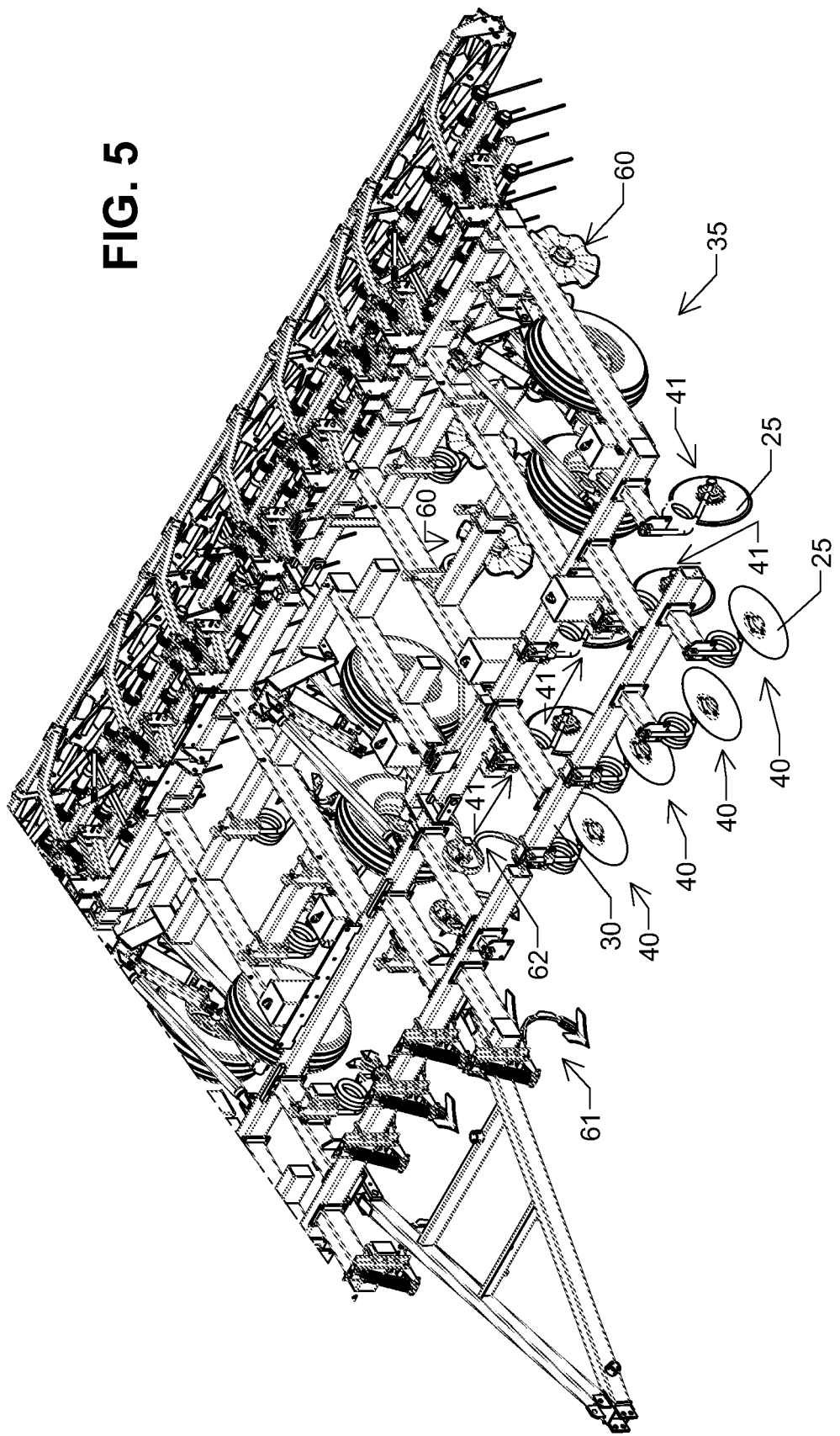

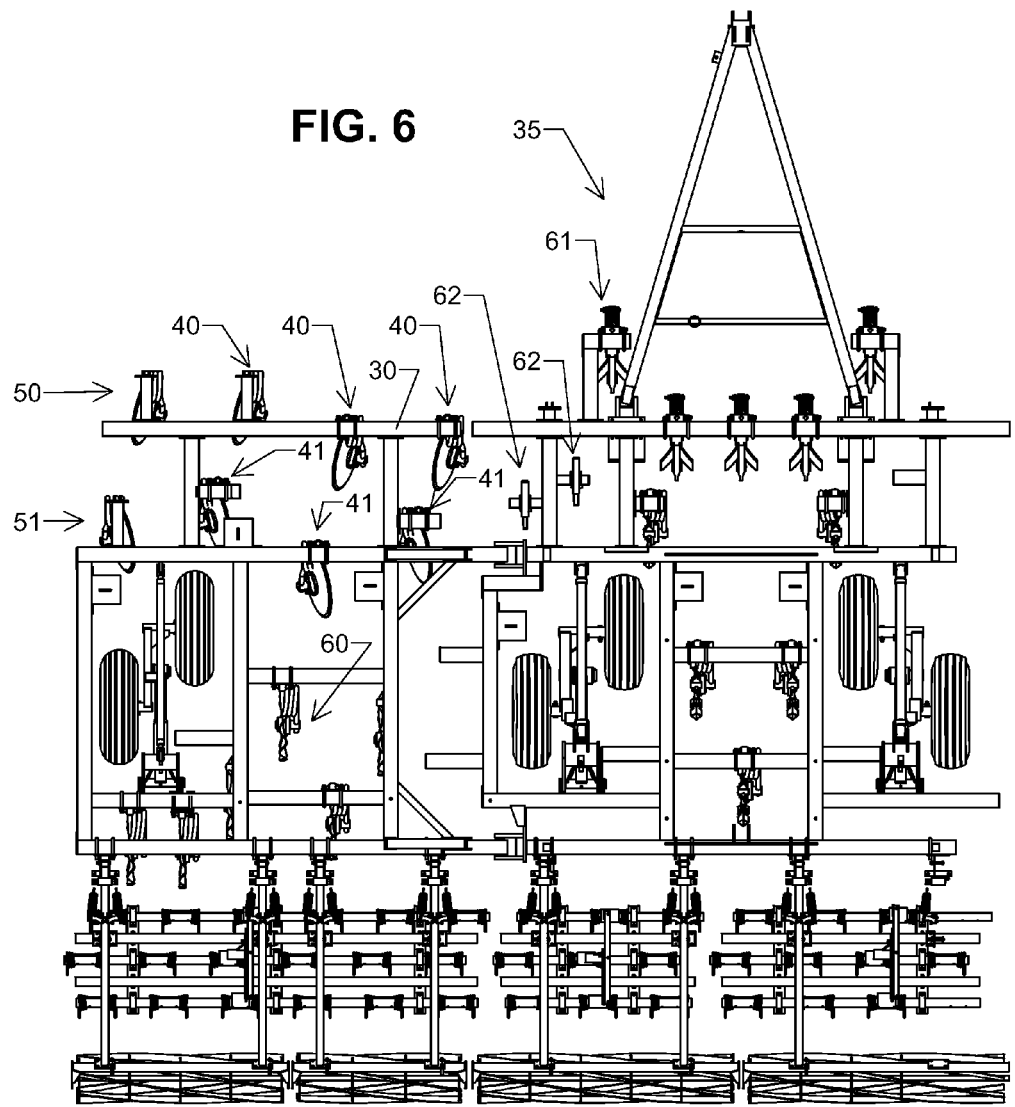

SPRING MOUNTED BLADE ASSEMBLY AND TILLAGE IMPLEMENT THEREWITH

CROSS-REFERENCE TO RELATED APPLICATIONS

This application claims the benefit of U.S. Patent Application 61/285,176, filed Dec. 9, 2009, the contents of which are incorporated herein by reference.

FIELD OF THE INVENTION

The invention relates to tillage blade assemblies for agricultural use that comprise springs. In particular, the invention relates to individual tillage blade assemblies comprising coil springs that permit the blade to deflect upwardly and tillage implements comprising the assemblies.

BACKGROUND OF THE INVENTION

Tillage implements, such as disc harrows, are known in agriculture for working the soil either following crop harvest or in preparation for spring planting. Typically, tillage implements work the soil at a depth of 4-6" in an effort to turn over new soil and cover crop residue on the surface. This is sometimes known as conventional or primary tillage and is in marked contrast to secondary or conservation tillage.

Disc harrows normally comprise a plurality of concave disc shaped blades mounted on a common gang shaft suspended beneath a tillage implement frame. The entire shaft is mounted at an angle relative to the direction of travel of the implement. By setting the angle, a different degree of tillage can be obtained. Attempts have been made to mount these shaft using C-shaped springs in an effort to absorb impact from obstacles present in the field. However, since the entire shaft is forced to move upwardly and deflect when a single disc encounters and obstacle, the force transmitted to the frame is still substantial. This can result in damage to the blades, the shaft bearings, or the shaft mounting assemblies. As a result, farmers are normally required to operate disc harrows at slower speeds in the range of 3-5 mph.

An additional problem with disc harrows is that, due to the close spacing of the blades on the gang shaft, plugging of crop residue can occur between the discs. This impedes operation of the implement and requires the farmer to stop and manually clean out the space between the discs before continuing.

A conservation tillage implement, designed to work the soil at shallow depths has been designed with individually mounted coulter wheel assemblies that are staggered. This apparatus is described in a co-pending US patent application published Mar. 9, 2006 as US 2006-0048953. This implement is for minimum tillage, not primary tillage, and comprises straight coulter wheels that do not engage with the soil in order to turn fresh soil on to the surface, but rather cut through crop residue by riding along parallel to the direction of travel of the implement. The individually mounted coulter wheel assemblies each comprise a coil spring having a horizontal spring axis, as described in U.S. Pat. No. 6,412,571. Attempts to place concave disc blades suitable for use in turning the soil on this assembly have resulted in an off-axis load being imparted to the coil spring. This causes the spring to deflect during normal operation of the tillage implement and results in the blades adopting an orientation more parallel with the direction of travel of the implement. This impedes the ability of the blade to turn the soil, which generally requires an angle with respect to the direction of travel.

As a result, there remains a need for an improved tillage blade mounting assembly and for tillage implements comprising same.

SUMMARY OF THE INVENTION

According to an aspect of the present invention, there is provided a tillage blade assembly comprising: a coil spring having a horizontal spring axis and first and second ends, the first end having a first shank extending tangentially therefrom and the second end having a second shank extending tangentially therefrom; the second shank having an upper portion proximal the spring and a lower portion distal from the spring, the lower portion comprising a shank axis, the upper shank portion and the lower shank portion offset from one another by an offset distance; the shank axis having a shank axis angle relative to a vertical direction perpendicular to the horizontal spring axis; the lower portion having mounted thereto a rotatable hub having a rotation axis passing therethrough, the rotation axis perpendicular to the shank axis, the rotation axis rotated about the lower shank axis by a rotation angle defined relative to the rotation axis being horizontal; and, a concave disc-shaped tillage blade attached to the rotatable hub concentric with the rotation axis.

According to another aspect of the invention, there is provided a tillage blade assembly comprising: a coil spring having a horizontal spring axis and first and second ends, the first end having a first shank extending tangentially therefrom and the second end having a second shank extending tangentially therefrom; the second shank having a shank axis; the shank axis having a shank axis angle relative to a vertical direction perpendicular to the horizontal spring axis; the lower portion having mounted thereto a rotatable hub having a rotation axis passing therethrough, the rotation axis perpendicular to the shank axis, the rotation axis rotated about the lower shank axis by a rotation angle defined relative to the rotation axis being horizontal; a concave disc-shaped tillage blade attached to the rotatable hub concentric with the rotation axis; and, the tillage blade, when in operation, having a point of intersection on its circumference where it initially penetrates a soil surface, the point of intersection being located between the first and second ends.

According to yet another aspect of the invention, there is provided a tillage implement comprising: an implement frame; at least two rows of tillage blade assemblies as previously described mounted to the frame; one row of tillage blade assemblies comprising a first assembly with a coil spring that is wound clockwise; an adjacent row of tillage blade assemblies comprising a second assembly with a coil spring that is wound counter-clockwise; and, the concave sides of the blades of the first and second assemblies facing one another.

The invention comprises tillage blade assemblies comprising a coil spring with a horizontal spring axis to permit upward deflection of a concave tillage blade in response to impact with obstacles. The mounting assembly provides for mounting the tillage blades in a particular orientation relative to the ground and the direction of travel of the implement in order that forces acting on the assembly due to movement of the blade through the soil are balanced such that there is little or no distortion of the coil spring relative to its spring axis. This prevents an off-axis load from acting on the spring when the assembly is in use and allows the blade to track through the soil at a desired angle. Impact with obstacles, such as rocks, is desirably absorbed by deflection of the coil spring, thereby mitigating damage to the assembly.

Tillage implements comprising the blade assemblies are able to operate at higher speeds than can usually be obtained for tillage implements, due to the absorption of impact energy by the spring. Typical operating speeds for such implements may be from 6 to 14 mph or 8 to 12 mph. The tillage implements may comprise a plurality of the blade assemblies in substantially matched left and right hand pairs. The tillage implements may comprise two or more rows of the tillage blade assemblies when seen in top view. There may be an even number of rows of the tillage blade assemblies. There may be a substantially equal number of left and right hand assemblies. One of the two rows may comprise one or more right hand assemblies and the other may comprise one or more left hand assemblies. The left and right hand assemblies may be provided in complementary pairs. The pairs may be arranged with one assembly on one row and the complementary assembly on an adjacent row. The assemblies may be arranged on the two rows such that the concave sides of the tillage blades are oriented towards one another.

There may be additional field working tools, such as S-tines, C-shanks, or coulter wheel assemblies (with a straight rather than concave blade) provided on the rows. The additional field working tools desirably comprise a spring or other resilient element in order to absorb energy from impact with obstacles.

Further features of the invention will be described or will become apparent in the course of the following description.

BRIEF DESCRIPTION OF THE DRAWINGS

In order that the invention may be more clearly understood, embodiments thereof will now be described in detail by way of example, with reference to the accompanying drawings, in which:

FIG. 5 is a perspective view of a portion of a tillage implement according to the invention comprising tillage blade assemblies as shown in FIGS. 3A and 3B; and, FIG. 6 is a top view of the tillage implement shown in FIG. 5.

DESCRIPTION OF PREFERRED EMBODIMENTS

Figure 1:
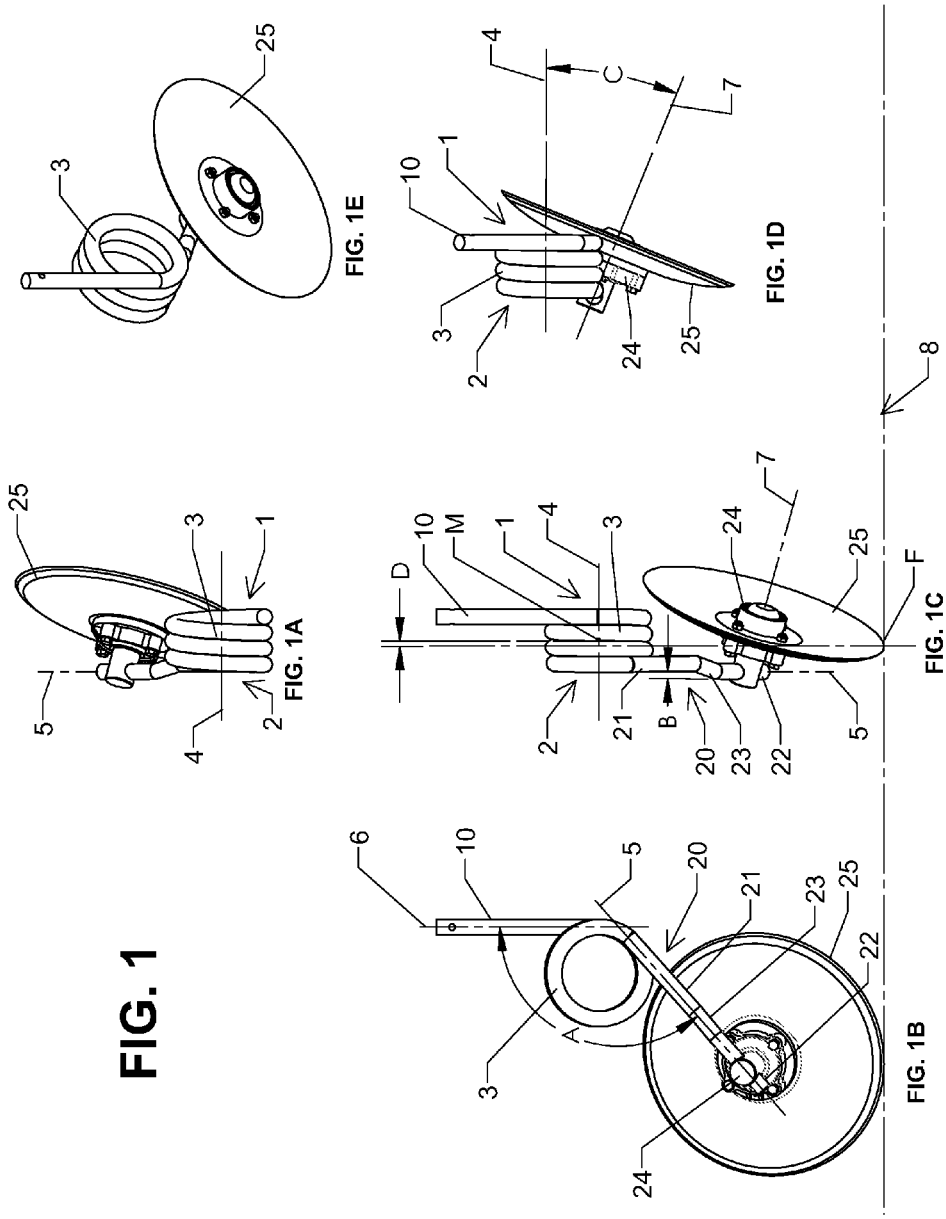
FIG. 1A is a top view of a tillage blade assembly according to the invention.
FIG. 1B is a left side view of the tillage blade assembly shown in FIG. 1A.
FIG. 1C is a front view of the tillage blade assembly shown in FIG. 1A.
FIG. 1D is a view along the shank axis of the tillage blade assembly shown in FIG. 1A.
FIG. 1E is a perspective view of the tillage blade assembly shown in FIG. 1A.

In describing the figures, like features are referred to by like reference numerals. Although not all features indicated on a particular drawing are necessarily described with reference to that drawing, all of the features are described with reference to at least one of the drawings.

Referring to FIGS. 1A-1E, a tillage blade assembly comprises a coil spring 3 having first and second ends 1, 2 with first and second shanks 10, 20 extending tangentially therefrom, respectively. The coil spring has a horizontal spring axis 4 passing concentrically therethrough. The second shank end 20 has an upper portion 21 and a lower portion 22 interconnected by an offset portion 23. The upper portion 21 is proximal the spring 3 and the lower portion 22 is distal from the spring 3. The lower shank portion has a shank axis 5 passing concentrically therethrough. As can be seen best with reference to FIG. 1B, the upper and lower shank portions are parallel with one another in this embodiment, although that need not necessarily always be the case.

The shank axis is provided at an angle A relative to a vertical direction 6 that is perpendicular to the horizontal spring axis 4. Although the first shank 10 is shown parallel with the vertical direction 6 in this embodiment, this choice of orientation for the first shank 10 is for convenience of mounting only and need not necessarily be so aligned in all embodiments.

A rotatable hub 24 is provided on the lower portion 22. The rotatable hub 24 has a rotation axis 7 passing through the center thereof. Referring to FIG. 1D, when viewed along the shank axis 5, the rotation axis 7 is rotated about the shank axis 5 by an angle C, relative to when the rotation axis 7 is parallel with the horizontal spring axis 4.

A concave disc-shaped tillage blade 25 is attached to the rotatable hub 24 concentric with the rotation axis 7. Referring to FIG. 1C, upon making initial contact with the soil surface, indicated by horizontal plane 8, a single point F on the circumference of the tillage blade 25 makes initial contact with the soil surface, indicated by horizontal plane 8. When seen in front view, the distance between the initial point of contact F and the midpoint M between the first and second ends 1, 2 along the horizontal spring axis 4 is represented by D. Although F may be located at a number of desirable locations between the first and second ends 1, 2, in this embodiment it is located between the midpoint M and the second end 2. The offset distance B between the upper and lower portions 21, 22 is selected so as to provide the desired location for the point of intersection F along the horizontal spring axis 4. The distance B need not necessarily be the same as the distance D and is a function of at least the length of the rotatable hub 24 and the shape or configuration of the upper and lower portions 21, 22. The distance B determines the length and angular orientation of the offset portion 23 relative to the upper and lower portions 21, 22. For example, if the offset portion 23 is perpendicular to the upper and lower portions 21, 22, then its length is shorter in order to meet the desired distance B than if it is provided at an angle, as in the embodiment shown in FIG. 1C. In alternative embodiments, the upper and shank portions may be indistinguishable from one another, in which case there is no distance B provided and only the distance D is relevant.

The angles A and C and the distance D (which is used to determine the distance B, where applicable) are carefully selected in combination with one another in order to balance the forces transmitted through the tillage blade assembly such that they are substantially perpendicular to the horizontal spring axis 4. In other words, they are selected so as to impart little side loading to the second shank 2. Side loading is detrimental in that it causes the coil spring 3 to distort, making it less able to absorb impact from obstacles and making the orientation of the blade relative to the soil uncertain as the axial rigidity of the spring is reduced. Since it is important that the concave disc-shaped blade 25 is presented to the soil at an angle relative to the direction of travel of the implement, so that the soil can be turned over to bury surface crop residue, the side loading that would normally be imparted to the assembly by this configuration needs to be abated by careful selection of the angles A, C and the distance D. These angles are a function of the concavity of the disc blade 25, the diameter of the disc blade 25, the number of coils, the stiffness of the coils in the coil spring 3 (measured by Rockwell C hardness), the desired working depth and working speed of the implement and the soil conditions.

Through experimentation, it has been determined that combinations of A, C and D suitable for operation across a range of these variables are as follows. The angle A may be from 130 degrees to +/−15 degrees, preferably +/−10 degrees, more preferably +/−5 degrees. The angle C may be from 20 degrees to +/−10 degrees, preferably from 22 degrees to +/−5 degrees, more preferably +/−3 degrees. The distance D may be from 1" to +/−0.75", preferably from 0.75" to +/−0.5", more preferably from 0.5" to +/−0.25". Where applicable, the distance B may be from 0" to 3", from 0.25" to 2.75", or from 0.5" to 2.5", depending on the distance D, as described above. The concavity of the disc blade 25 may be from 730 mm+/−50 mm. The diameter of the disc blade 25 may be from 16" to 24", preferably from 17" to 23", more preferably from 18" to 22", yet more preferably from 19" to 21". The spring may have a Rockwell C hardness of from 30 to 55, preferably from 35 to 50, more preferably from 40 to 45. The number of coils in the spring, as seen in front view, may be from 3 to 6, preferably 4 to 5. The desired working depth may be from 2" to 8", preferably 3" to 7", more preferably 4" to 6". The desired operational speed of the tillage implement may be in excess of 6 mph, preferably from 8 to 14 mph, more preferably 10 to 12 mph.

Figure 2:
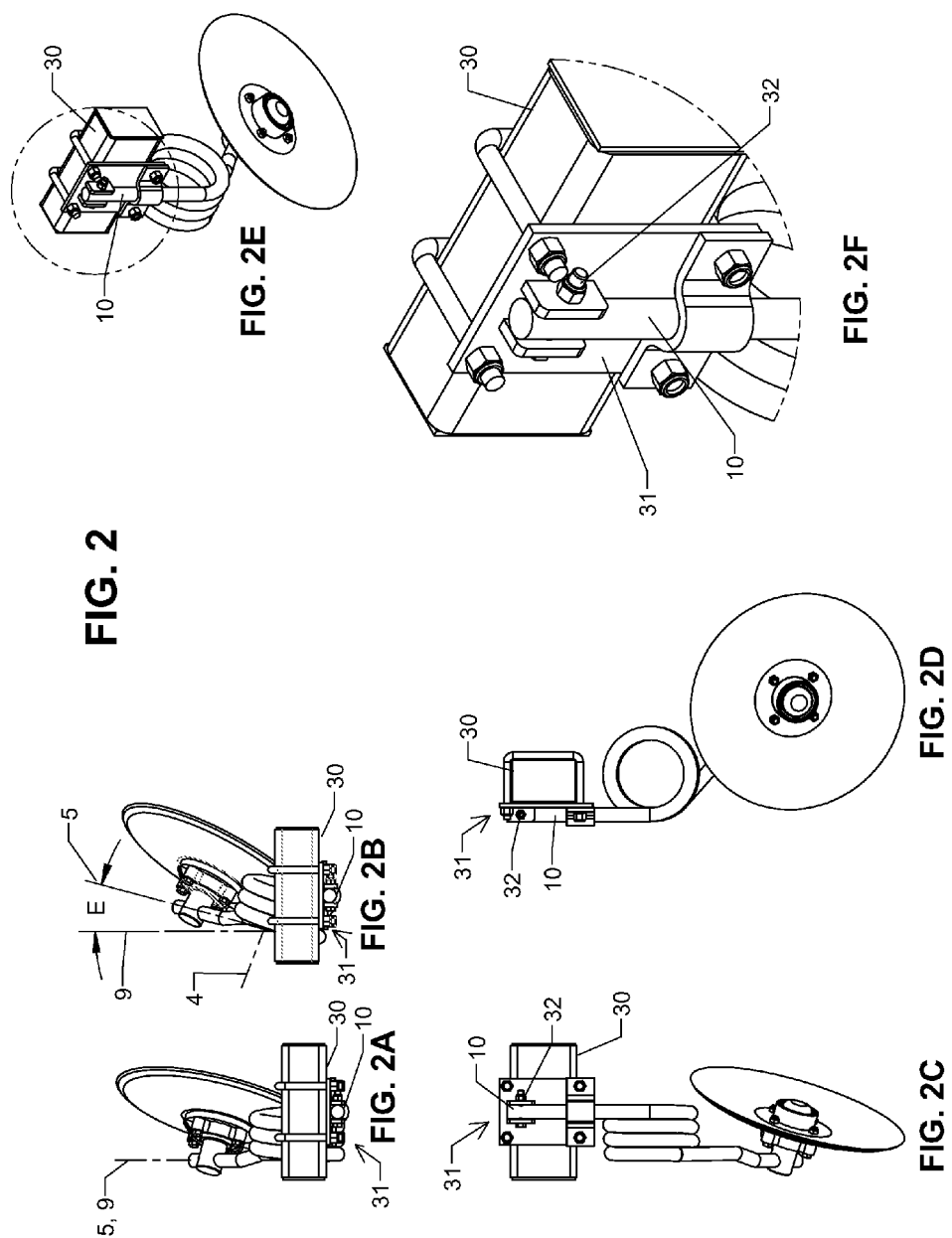
FIG. 2A is a top view of the tillage blade assembly of FIG. 1A mounted to a frame portion of a tillage implement.
FIG. 2B is a top view analogous to FIG. 2A, showing an alternative mounting configuration.
FIG. 2C is a front view of the tillage blade assembly of FIG. 2A.
FIG. 2D is a left side view of the tillage blade assembly of FIG. 2A.
FIG. 2E is a perspective view of the tillage blade assembly of FIG. 2A.
FIG. 2F is a detailed view of the mounting configuration for the tillage blade assembly corresponding to the dashed circle identified in FIG. 2E.

Referring to FIG. 2A, a mounting configuration is shown wherein the horizontal spring axis 4 (hidden beneath the frame member 30) is substantially parallel with the frame member 30 and therefore perpendicular to the direction of travel 9 of the implement. Thus, the shank axis 5 is perpendicular to the frame member 30 and parallel with the direction of travel 9. In an alternative mounting configuration, shown in FIG. 2B, the spring axis 4 is not aligned with the frame member 30, thus the shank axis 5 is at an angle E relative to the direction of travel 9. This configuration would of course require different angles A, C and distance D, as compared with FIG. 2A. The angle E may be from 15 degrees to +/−10 degrees, preferably +/−5 degrees.

Referring additionally to FIGS. 2C to 2F, the mounting configuration employed utilizes a clamp 31 to secure the first shank 10 to the frame member 30. This clamp 31 secures the first shank 10 in a fixed orientation relative to the frame member 30 by means of a bolt 32 passing through the first shank 10. Other embodiments are contemplated wherein the shank is permitted to swivel about a vertical axis aligned with the first shank 10 by securing it within bushings, as described in US 2006-0048953, which is incorporated herein by reference. Since the forces on the assembly are balanced, it is contemplated that this type of mounting configuration would allow the blade 25 to travel through the soil at an angle sufficient to turn the soil, without castering freely to a parallel orientation with the direction of travel 9. This would allow the implement to be turned at the end of the field without raising the implement, which is normally not possible without damaging the implement or causing large ruts to be formed in the soil.

Figure 3:
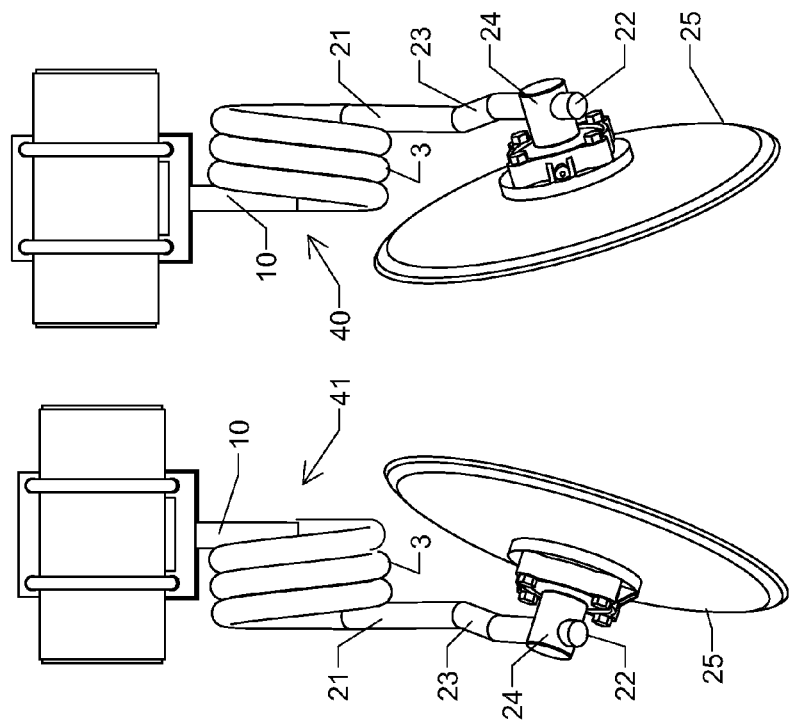
FIG. 3A is a front view of a left side tillage blade assembly with a counter-clockwise would spring.
FIG. 3B is a front view of a right side tillage blade assembly with a clockwise wound spring.
Figure 4:
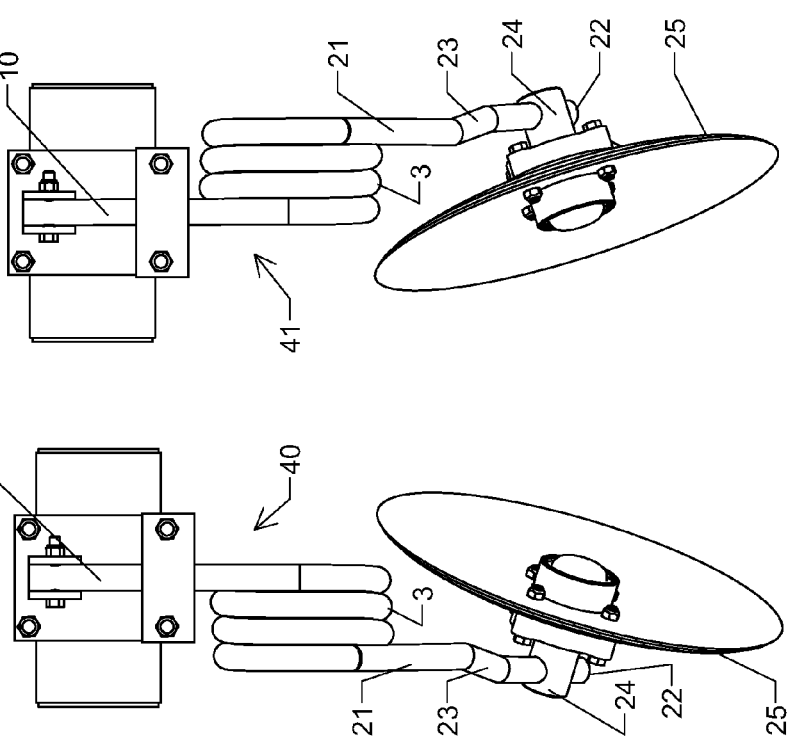
FIG. 4A is a rear view of the tillage blade assembly of FIG. 3A.
FIG. 4B is a rear view of the tillage blade assembly of FIG. 3B.

Referring to FIGS. 3A and 3B, a front view of a pair of tillage assemblies according to the invention is shown. FIG. 3A shows a left hand tillage assembly 40 with a spring 3 that is would counter-clockwise, whereas FIG. 3B shows a complementary right hand tillage assembly 41 with a spring 3 that is would clockwise. The open or concave faces of the disc blades 25 are oriented towards one another. This allows any soil that is thrown in one direction to be thrown back in the opposite direction by the complementary assembly, thereby leveling the soil better than compared with conventional non-opposing disc harrows. Referring to FIGS. 4A and 4B, the same pair of assemblies 40, 41 is shown in rear view. It can be seen that both disc blades 25 are angled relative to the direction of travel, which is into the page in this view, and relative to vertical.

Referring to FIGS. 5 and 6, a portion of a tillage implement 35 is shown comprising opposing pairs of left hand 40 and right hand 41 tillage assemblies according to the invention. The assemblies are oriented in pairs with the concave sides of the blades 25 facing one another. There are at least two rows 50, 51 of assemblies with at least a left hand assembly 40 and a right hand assembly 41 on each row. The assemblies on the first row 50 are laterally staggered relative to the assemblies in the adjacent row 51. There may be additional field working tools provided on the implement, such as coulter wheel assemblies 60, C-shanks 61 and/or S-tines 62. These additional field working tools preferably comprise a spring mounting means. This allows all of the field working tools 60, 61 or 62 to also absorb impact with obstacles and thereby prevent damage to the tools or the implement 35 when operated at speeds in excess of 6 mph and preferably in the range of 8-14 mph.

It will be appreciated by those skilled in the art that there are many types of concave disc blades 25 suitable for use with the invention. In particular, concave blades 25 having a wavy edge, a serrated edge or a notched edge may be used depending on the soil conditions and desired degree of tillage.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A tillage blade assembly comprising:
  a coil spring having a horizontal spring axis and first and second ends, the first end having a first shank extending tangentially therefrom and the second end having a second shank extending tangentially therefrom;
  the second shank having an upper portion proximal the spring and a lower portion distal from the spring, the lower portion comprising a shank axis, the upper shank portion and the lower shank portion offset from one another by an offset distance;

the shank axis having a shank axis angle relative to a vertical direction perpendicular to the horizontal spring axis;

the lower portion having mounted thereto a rotatable hub having a rotation axis passing therethrough, the rotation axis perpendicular to the shank axis, the rotation axis rotated about the lower shank axis by a rotation angle defined relative to the rotation axis being horizontal; and, a concave disc-shaped tillage blade attached to the rotatable hub concentric with the rotation axis, wherein the offset distance, the shank axis angle and the rotation angle are selected so as to balance the forces transmitted through the assembly to be substantially parallel to the horizontal spring axis when the assembly is in use on a tillage implement.

2. The tillage blade assembly according to claim 1, wherein the upper shank portion and lower shank portion are parallel to one another.

3. The tillage blade assembly according to claim 1, wherein the offset distance is horizontal.

4. A tillage implement comprising:
a) an implement frame;
b) at least two rows of tillage blade assemblies according to claim 1 mounted to the frame;
c) one row of tillage blade assemblies comprising a first assembly with a coil spring that is wound clockwise;
d) an adjacent row of tillage blade assemblies comprising a second assembly with a coil spring that is wound counter-clockwise; and,
e) the concave sides of the blades of the first and second assemblies facing one another.

5. The tillage blade assembly according to claim 1, wherein the offset distance is from 0" to 3", the shank axis angle is from 130 degrees to +/−15 degrees and the rotation angle is from 20 degrees to +/−10 degrees.

6. The tillage blade assembly according to claim 5, wherein the disc blade has a concavity of from 730 mm+/−50 mm.

7. The tillage blade assembly according to claim 6, wherein the diameter of the disc blade is from 16" to 24".

8. The tillage blade assembly according to claim 7, wherein the spring has a Rockwell C hardness of from 30 to 55.

9. The tillage implement according to claim 8, wherein the number of coils in the spring, as seen in front view, is from 3 to 6.

10. The tillage implement according to claim 4, wherein the working depth is from 2" to 8".

11. The tillage implement according to claim 10, wherein the desired operational speed of the tillage implement is in excess of 6 mph.

12. The tillage implement according to claim 4, wherein the tillage blade assembly comprises: a coil spring having a horizontal spring axis and first and second ends, the first end having a first shank extending tangentially therefrom and the second end having a second shank extending tangentially therefrom; the second shank having an upper portion proximal the spring and a lower portion distal from the spring, the lower portion comprising a shank axis, the upper shank portion and the lower shank portion offset from one another by an offset distance; the shank axis having a shank axis angle relative to a vertical direction perpendicular to the horizontal spring axis; the lower portion having mounted thereto a rotatable hub having a rotation axis passing therethrough, the rotation axis perpendicular to the shank axis, the rotation axis rotated about the lower shank axis by a rotation angle defined relative to the rotation axis being horizontal; and, a concave disc-shaped tillage blade attached to the rotatable hub concentric with the rotation axis, wherein the offset distance, the shank axis angle and the rotation angle are selected so as to balance the forces transmitted through the assembly to be substantially parallel to the horizontal spring axis when the assembly is in use on a tillage implement.

13. The tillage implement according to claim 12, wherein the offset distance is from 0" to 3", the shank axis angle is from 130 degrees to +/−15 degrees and the rotation angle is from 20 degrees to +/−10 degrees.

14. The tillage implement according to claim 13, wherein the diameter of the disc blade is from 16" to 24".

15. The tillage implement according to claim 14, wherein the spring has a Rockwell C hardness of from 30 to 55.

16. The tillage implement according to claim 15, wherein the number of coils in the spring, as seen in front view, is from 3 to 6.

17. A tillage blade assembly comprising:
a coil spring having a horizontal spring axis and first and second ends, the first end having a first shank extending tangentially therefrom and the second end having a second shank extending tangentially therefrom;
the second shank having a shank axis;
the shank axis having a shank axis angle relative to a vertical direction perpendicular to the horizontal spring axis;
the lower portion having mounted thereto a rotatable hub having a rotation axis passing therethrough, the rotation axis perpendicular to the shank axis, the rotation axis rotated about the lower shank axis by a rotation angle defined relative to the rotation axis being horizontal;
a concave disc-shaped tillage blade attached to the rotatable hub concentric with the rotation axis; and,
the tillage blade, when in operation, having a point of intersection on its circumference where it initially penetrates a soil surface, the point of intersection being located between the first and second ends,
wherein the point of intersection is between the midpoint between the first and second ends along the horizontal axis and the second end, and
wherein the distance between the point of intersection and the midpoint, the shank axis angle and the rotation angle are selected so as to balance the forces transmitted through the assembly to be substantially parallel to the horizontal spring axis when the assembly is in use on a tillage implement.

18. A tillage implement comprising:
a) an implement frame;
b) at least two rows of tillage blade assemblies according to claim 17 mounted to the frame;
c) one row of tillage blade assemblies comprising a first assembly with a coil spring that is wound clockwise;
d) an adjacent row of tillage blade assemblies comprising a second assembly with a coil spring that is wound counter-clockwise; and,
e) the concave sides of the blades of the first and second assemblies facing one another.

19. The tillage blade assembly according to claim 17, wherein the distance between the point of intersection and the midpoint is from 1" to +/−0.75", the shank axis angle is from 130 degrees to +/−15 degrees and the rotation angle is from 20 degrees to +/−10 degrees.

20. The tillage implement according to claim 18, wherein the distance between the point of intersection and the midpoint is from 1" to +/−0.75", the shank axis angle is from 130 degrees to +/−15 degrees and the rotation angle is from 20 degrees to +/−10 degrees.

* * * * *